United States Patent
Seidel et al.

(10) Patent No.: US 9,207,253 B2
(45) Date of Patent: Dec. 8, 2015

(54) ICE RESISTANT PITOT TUBE

(71) Applicant: Rosemount Aerospace Inc., Burnsville, MN (US)

(72) Inventors: Greg Seidel, Farmington, MN (US); Timothy Thomas Golly, Lakeville, MN (US); Paul Robert Johnson, Prior Lake, MN (US)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 102 days.

(21) Appl. No.: 14/065,878

(22) Filed: Oct. 29, 2013

(65) Prior Publication Data

US 2014/0116154 A1   May 1, 2014

Related U.S. Application Data

(60) Provisional application No. 61/720,643, filed on Oct. 31, 2012.

(51) Int. Cl.
*G01F 1/46* (2006.01)
*G01P 5/165* (2006.01)

(52) U.S. Cl.
CPC .................................... *G01P 5/165* (2013.01)

(58) Field of Classification Search
CPC ........................................................ G01F 1/46
USPC ........................................ 73/861.65, 861.68
See application file for complete search history.

(56) References Cited

U.S. PATENT DOCUMENTS

| | | | |
|---|---|---|---|
| 1,971,534 A | 8/1934 | Peace | |
| 2,254,155 A | 8/1941 | Reichel | |
| 2,300,654 A * | 11/1942 | Daiber | 73/861.68 |
| 2,482,701 A | 11/1946 | Anderson | |
| 2,984,107 A * | 5/1961 | Strieby et al. | 73/312 |
| 2,995,932 A * | 8/1961 | Hardgrave, Jr. | 73/861.65 |
| 3,043,142 A * | 7/1962 | Eiland, Jr. et al. | 73/861.65 |
| 3,267,992 A * | 8/1966 | Werner et al. | 165/48.1 |
| 3,364,742 A * | 1/1968 | De Leo | 73/861.68 |
| 3,383,916 A * | 5/1968 | Werner | 73/861.68 |
| 3,392,585 A * | 7/1968 | Bentz et al. | 73/700 |
| 3,415,120 A * | 12/1968 | De Leo et al. | 73/861.65 |
| 2005/0011285 A1* | 1/2005 | Giterman | 73/861.65 |
| 2006/0178790 A1 | 8/2006 | Shigemi et al. | |

FOREIGN PATENT DOCUMENTS

GB             779754 A          7/1957

OTHER PUBLICATIONS

European Search Report for Application No. 13190036.7-1558, Mailed Dec. 20, 2013. 8 pages.

* cited by examiner

*Primary Examiner* — Jewel V Thompson
(74) *Attorney, Agent, or Firm* — Cantor Colburn LLP

(57) ABSTRACT

A pitot tube includes a substantially cylindrical body portion and a tip portion extending along a pitot tube axis from the body portion. The tip portion includes an inlet opening and a radially tapering outer surface extending from the body portion toward the inlet opening. Another pitot tube includes a substantially cylindrical body portion and a tip portion extending along a pitot tube axis from the body portion. The tip portion includes an inlet opening. One or more electrical coils including one or more coil wraps are located at an interior of the pitot tube. One or more bulkheads are located between a forwardmost coil wrap and a drainage feature to limit travel of particles ingested into the interior.

13 Claims, 2 Drawing Sheets

ICE RESISTANT PITOT TUBE

BACKGROUND OF THE INVENTION

The subject matter disclosed herein generally relates to pitot tubes. More specifically, the present disclosure relates to ice prevention and removal from pitot tubes.

A pitot tube is widely used to determine airspeed of an aircraft or other vehicle or to measure air or gas velocities in industrial applications. In particular, by measuring stagnation pressure of a fluid driven into the pitot tube, and together with a measured static pressure, the airspeed of the aircraft can be determined. In certain flight conditions, the pitot tube may be subject to ice accumulation from moisture in the air. For this reason, pitot tubes are equipped with heating elements to prevent such ice accumulation. Further, in other conditions, the pitot tube may ingest ice crystals, which then accumulate inside of the pitot tube and cause failure in its operation. A typical pitot tube is substantially cylindrical with an internal diameter containing the heating elements, or coils, are arranged. Forward of the heating elements is a tip portion that extends radially from a throat diameter, typically smaller than the internal diameter, to an outer diameter of the pitot tube. The tip portion extends axially from the throat to a pitot tube inlet. The pitot tube inlet has a diameter greater than the throat. An exterior of the typical tube is cylindrical along its length to the inlet. Such a tube has a large surface area of material in the tip portion forward of the heater, and is difficult to heat and therefore to prevent ice accumulation thereon. Further, a large inlet diameter allows for proportionally more ice crystals to be ingested by the pitot tube. Such ingested ice crystals must be melted by the heating elements and drained from the pitot tube.

BRIEF DESCRIPTION OF THE INVENTION

According to one aspect of the invention, a pitot tube includes a substantially cylindrical body portion and a tip portion extending along a pitot tube axis from the body portion. The tip portion includes an inlet opening and a radially tapering outer surface extending from the body portion toward the inlet opening. The radially tapering outer surface has a concave arc cross-section.

According to another aspect of the invention, a pitot tube includes a substantially cylindrical body portion and a tip portion extending along a pitot tube axis from the body portion. The tip portion includes an inlet opening. One or more electrical coils including one or more coil wraps are located at an interior of the pitot tube. One or more bulkheads are located between the pitot inlet and drainage features. An additional bulkhead may also be aft of the drainage feature.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
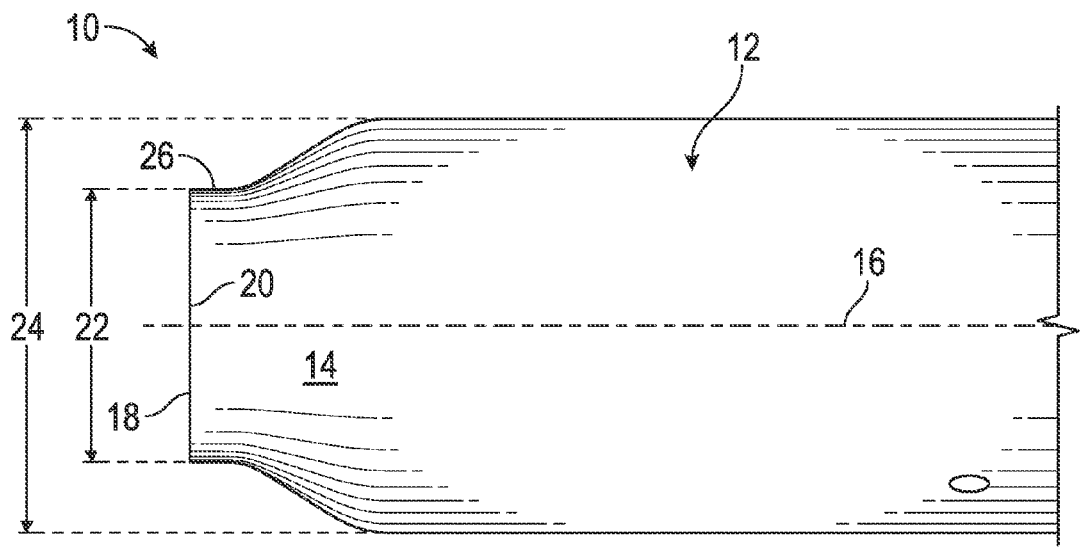
FIG. 1 is an illustration of an embodiment of a pitot tube.

Shown in FIG. 1 is a view of an embodiment of a pitot tube 10. The pitot tube 10 includes a cylindrical body portion 12 and a tip portion 14 extending along a tube axis 16 from the body portion 12 toward a tube inlet 18. In the embodiment of FIG. 1, the tip portion 14 includes an inlet opening 20 having an inlet diameter 22 smaller than a body diameter 24 of the body portion 12. The tip portion 14, between the body portion 12 and the inlet opening 20, tapers in diameter along a concave curve 26. In some embodiments, the concave curve 26 does not extend entirely to the inlet opening 20 as the inlet diameter 22 extends axially from the inlet opening 20 to the concave curve 26.

Figure 2:
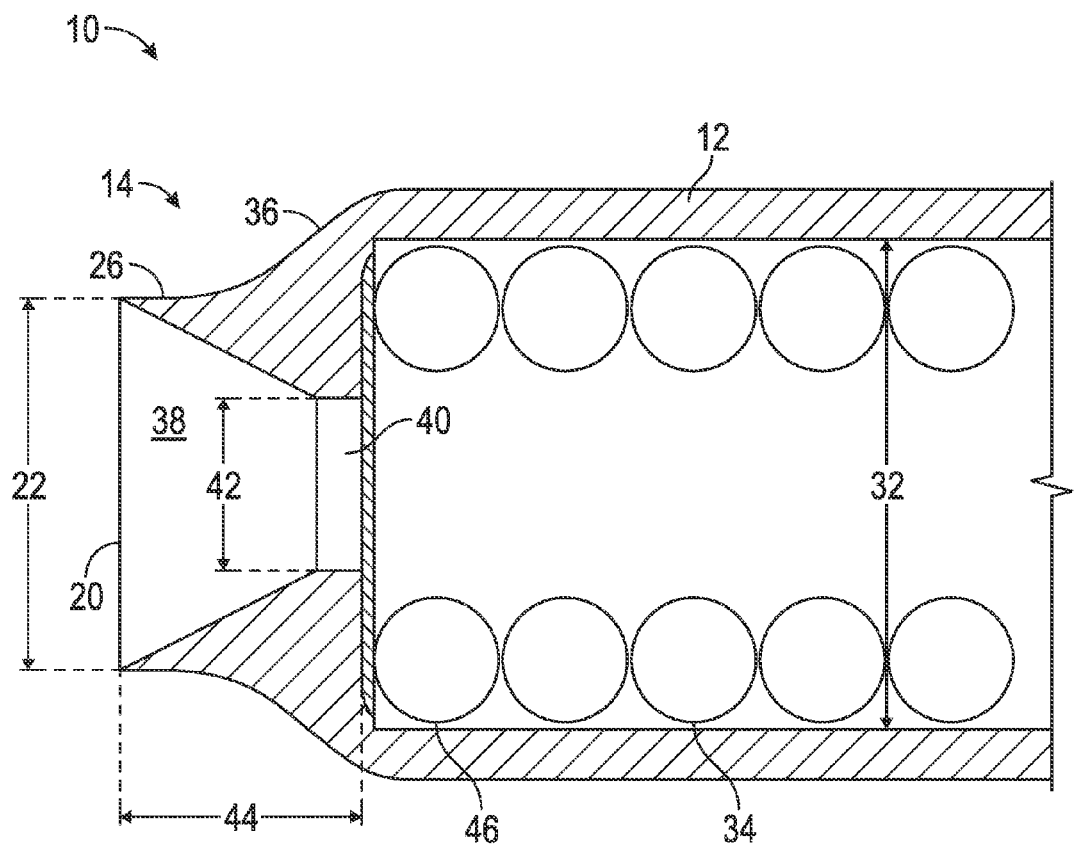
FIG. 2 is a cross-sectional view of an embodiment of a pitot tube.

Referring now to the cross-sectional view of FIG. 2, the pitot tube 10 has an interior 30 having an interior diameter 32. A heating element, or coil 34, is located in the interior 30. When an electrical current is applied to the coil 34, the pitot tube 10 is heated, thus melting accumulated ice, or preventing ice accumulation at an exterior 36, interior 38 of the tip portion 14, and interior portion 30. The tip portion 14 is separated from the interior 30 by a tube throat 40 having a throat diameter 42. The inlet diameter 22 and the throat diameter 42 are reduced compared to prior art pitot tubes 10 to limit or reduce the particle size and/or number of particles, including ice crystals, ingested into the pitot tube 10 thereby reducing ice accumulation in the interior 30 of the pitot tube 10. In some embodiments, the inlet diameter 22 is between about 0.200 inches (0.508 centimeters) and about 0.300 inches (0.762 centimeters), while the throat diameter 42 is between about 0.100 inches (0.254 centimeters) and 0.200 inches (0.508 centimeters). The configuration of FIG. 2 increases the effectiveness of the coil 34 in heating the tip portion 14 by reducing a distance 44 between the coil 34 and the inlet opening 20, thereby reducing a temperature difference between the coil 34 and the inlet opening 20, an area of high convective activity. This, in turn, reduces demands on the coil allowing a coil size, or number of windings in the coil 34 to be reduced. Further, the concave curve 26 reduces a cross-sectional area of material in the tip portion 14. This, in turn, reduces demand on the coil 34, especially a forward-most wrap 46 of the coil 34 through which heat is conducted into the tip portion 14.

Figure 3:
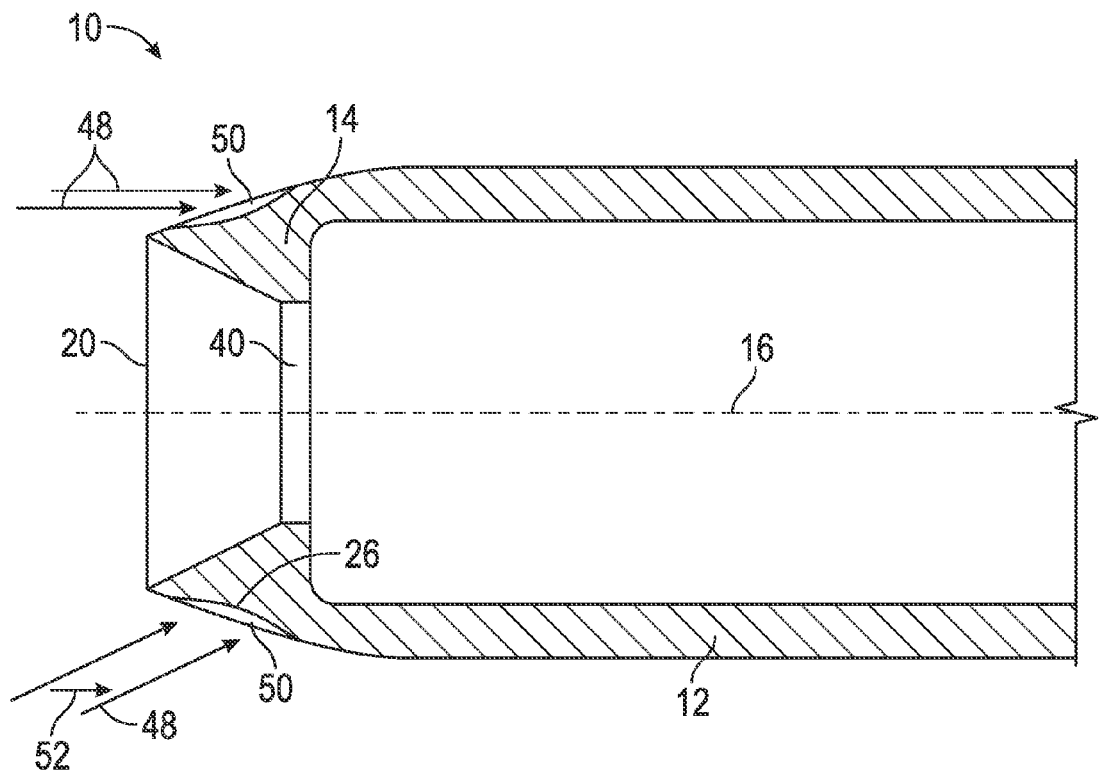
FIG. 3 is a comparison of an embodiment of a pitot tube with a previous pitot tube.

Referring now to FIG. 3, when particles 48, for example, liquid water or ice, impinge the pitot tube 10, they do so nearer to the coil 34 than in previous pitot tubes. As shown, particles 48 travelling substantially along the tube axis 16 travel further along the tube axis 16 past the inlet 20, when compared to a prior art tapered tube 50, before impinging on the pitot tube 10 due to the concave curve 26 of the tip portion 14. Particles 48 traveling at an angle 52 relative to the tube axis 16, impinge the tip portion 14 at a location radially inboard, when compared to a prior art tapered tube 48, due again to the concave curve 26 of the tip portion. Impingement of particles 48 closer to the coil 34 results in more effective prevention of ice buildup by the coil 34.

Figure 4:
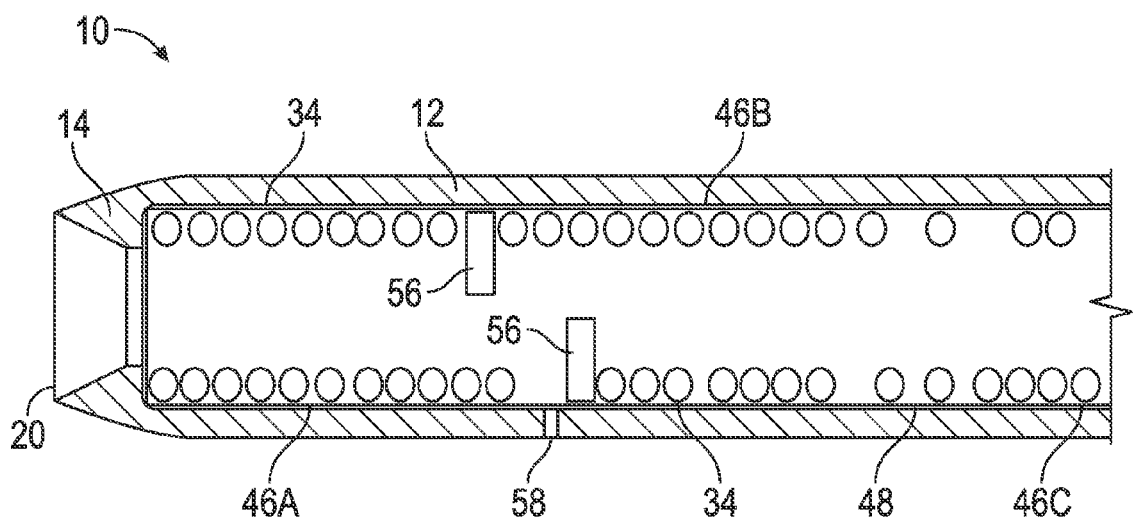
FIG. 4 is a cross-sectional view of another embodiment of a pitot tube.

Referring now to FIG. 4, the coil 34 includes a plurality of wraps 46 arranged along the tube axis 16. The wraps 46 generally decrease in watt density, and heating performance, with distance from the inlet opening 20, with the forwardmost wrap 46a having the greatest watt density, and successive wraps 46b and 46c having decreased watt density. One or more bulkheads 56 are located in the interior 30 to block or partially block pathways for ingested particles, such as ice crystals, to travel down the pitot tube 10. In a typical pitot tube, the bulkheads 56 are located far down the pitot tube 10, for example, between wraps 46b and 46c. In the embodiment of FIG. 4, however, the bulkheads 56 are located as close to the inlet opening 20 as possible, between wraps 46a and 46b. This prevents ice crystals from traveling down the pitot tube 10 to portions of the pitot tube 10 where the watt density of the wraps 46 is decreased from optimal. The embodiment of FIG. 4 takes advantage of the relatively high watt density of the forwardmost wrap 46a to quickly melt any ingested ice crystals. Thus performance of the coil 34 in preventing ice crystal accumulation is improved while not increasing an amount of electrical power directed to the coil 34.

Once melted, the resulting water from the ice crystals is drained from the pitot tube 10 via one or more drain openings 58. In some embodiments, the drain openings 58 are located forward of at least one bulkhead 56 of the plurality of bulkheads 56. As shown in FIG. 4, in some embodiments, the drain opening 58 location is between wraps 46a and 46b. By melting ice crystals and draining the resultant water from the pitot tube 10 at locations forward of wrap 46b, watt density of wraps 46b and 46c, and further successive wraps can be reduced, and the amount of electrical power supplied to the coil 34 can be reduced. In some embodiments, the successive wraps 46b or 46c downstream of the bulkheads 56 may be eliminated entirely.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A pitot tube comprising:
a substantially cylindrical body portion; and
a tip portion extending along a pitot tube axis from the body portion, the tip portion including:
an inlet opening;
a radially tapering outer surface extending from the body portion toward the inlet opening;
an interior portion having a fluid flow passage; and
a heating element arranged along the flow passage, the heating element defining a heating zone configured and disposed to be directly fluidically exposed to fluid flowing along the fluid flow passage.

2. The pitot tube of claim 1, wherein the radially tapering outer surface has a concave arc cross-section.

3. The pitot tube of claim 1, wherein the heading element includes one or more electrical coils comprising one or more coil wraps disposed along the fluid flow passage.

4. The pitot tube of claim 3, further comprising one or more bulkheads disposed along the fluid flow passage to limit travel of particles ingested into the interior.

5. The pitot tube of claim 4, wherein the one or more bulkheads are disposed between a forwardmost coil wrap and drainage features arranged in the heating zone.

6. The pitot tube of claim 4, wherein the particles are ice crystals.

7. The pitot tube of claim 6, wherein the one or more electrical coils melt the ice crystals.

8. The pitot tube of claim 7, further comprising one or more drain openings disposed between an aftmost bulkhead and the inlet opening within the heating zone to drain remains of the melted ice crystals from the pitot tube.

9. A pitot tube comprising:
a substantially cylindrical body portion;
a tip portion extending along a pitot tube axis from the body portion, the tip portion including an inlet opening;
an interior portion having a fluid flow passage;
one or more electrical coils comprising one or more coil wraps disposed along the fluid flow passage defining a heating zone; and
one or more bulkheads disposed along the fluid flow passage between a forwardmost coil wrap and a drainage feature disposed in the heating zone to limit travel of particles ingested into the interior.

10. The pitot tube of claim 9, wherein the tip portion includes a radially tapering outer surface extending from the body portion toward the inlet opening, the radially tapering outer surface having a concave arc cross-section.

11. The pitot tube of claim 9, wherein the particles are ice crystals.

12. The pitot tube of claim 11, wherein the one or more electrical coils melt the ice crystals.

13. The pitot tube of claim 12, further comprising one or more drain openings disposed between an aftmost bulkhead and the inlet opening to drain remains of the melted ice crystals from the pitot tube.

\* \* \* \* \*